United States Patent [19]
Jusa et al.

[11] Patent Number: 5,655,219
[45] Date of Patent: Aug. 5, 1997

[54] WIRELESS LAN SYSTEM CAPABLE OF RETRANSMISSION UNDER MANAGEMENT OF A BASE STATION DEVICE TO A DESTINATION MOBILE TERMINAL DEVICE

[75] Inventors: Hidehiko Jusa, Hadano; Eiichi Amada, Hunabashi; Yoshihiro Takiyasu, Higashi murayama; Tomoaki Ishifuji, Tokyo; Genichi Ishii, Hachiouji; Shuichi Adachi, Hadano, all of Japan

[73] Assignee: Hitachi, Ltd., Tokyo, Japan

[21] Appl. No.: 206,485

[22] Filed: Mar. 4, 1994

[30] Foreign Application Priority Data

Mar. 5, 1993 [JP] Japan .................... 5-044894

[51] Int. Cl.⁶ ........................................ H04B 7/00
[52] U.S. Cl. ................... 370/338; 455/435; 455/524
[58] Field of Search ......................... 455/33.1, 54.1, 455/53.1, 54.2, 56.1, 67.1, 33.4, 33.2; 379/59, 60, 63; 370/85.13, 94.1, 94.2

[56] References Cited

U.S. PATENT DOCUMENTS

| | | | |
|---|---|---|---|
| 4,534,061 | 8/1985 | Ulug | 455/34.2 |
| 4,794,649 | 12/1988 | Fujiwara | 455/343 |
| 5,054,110 | 10/1991 | Comroe et al. | 455/33.1 |
| 5,095,531 | 3/1992 | Ito | 455/33.2 |
| 5,212,806 | 5/1993 | Natarajan | 455/33.2 |
| 5,276,905 | 1/1994 | Hurst et al. | 455/33.1 |
| 5,293,639 | 3/1994 | Wilson et al. | 455/69 |
| 5,335,278 | 8/1994 | Matchett et al. | 455/56.1 |
| 5,379,451 | 1/1995 | Nakagoshi et al. | 455/56.1 |
| 5,448,760 | 9/1995 | Frederick | 455/33.1 |

FOREIGN PATENT DOCUMENTS

| | | |
|---|---|---|
| 1256234 | 10/1989 | Japan . |
| 4249443 | 9/1992 | Japan . |

*Primary Examiner*—Reinhard J. Eisenzopf
*Assistant Examiner*—Doris To
*Attorney, Agent, or Firm*—Jenner & Block

[57] ABSTRACT

A wireless network is provided for restricting the number of mobile terminal devices which are managed by the base station device for wireless communication with one another. The base station device has a mobile terminal confirming database for registering mobile terminal devices allowed to be subscribers to the wireless network, and a mobile terminal managing database for registering presently-managed mobile terminal devices. The wireless transfer request from one of the mobile terminal devices is tested to determine whether the request-issuing mobile terminal device is one of the subscribers. If the request is accepted, then the identification of the request-issuing mobile terminal device is registered into the managing database.

26 Claims, 18 Drawing Sheets

FIG. 13

| BASE STATION RECEIVING CONDITION \ DESTINATION RECEIVING CONDITION | SUCCESS (ACK RESPONSE/ NO RESPONSE (MULTI: CAST COMMUNICATION) | FAIL (NAK RESPONSE/ RESPONSE ERROR/ NO RESPONSE INTRACELL COMMUNICATION) |
|---|---|---|
| SUCCESS | TRANSFER COMPLETE 〜401 | BASE STATION RE-TRANSMISSION 〜402 |
| FAIL | TRANSFER COMPLETE 〜401 | SENDER RE-TRANSMISSION 〜403 |

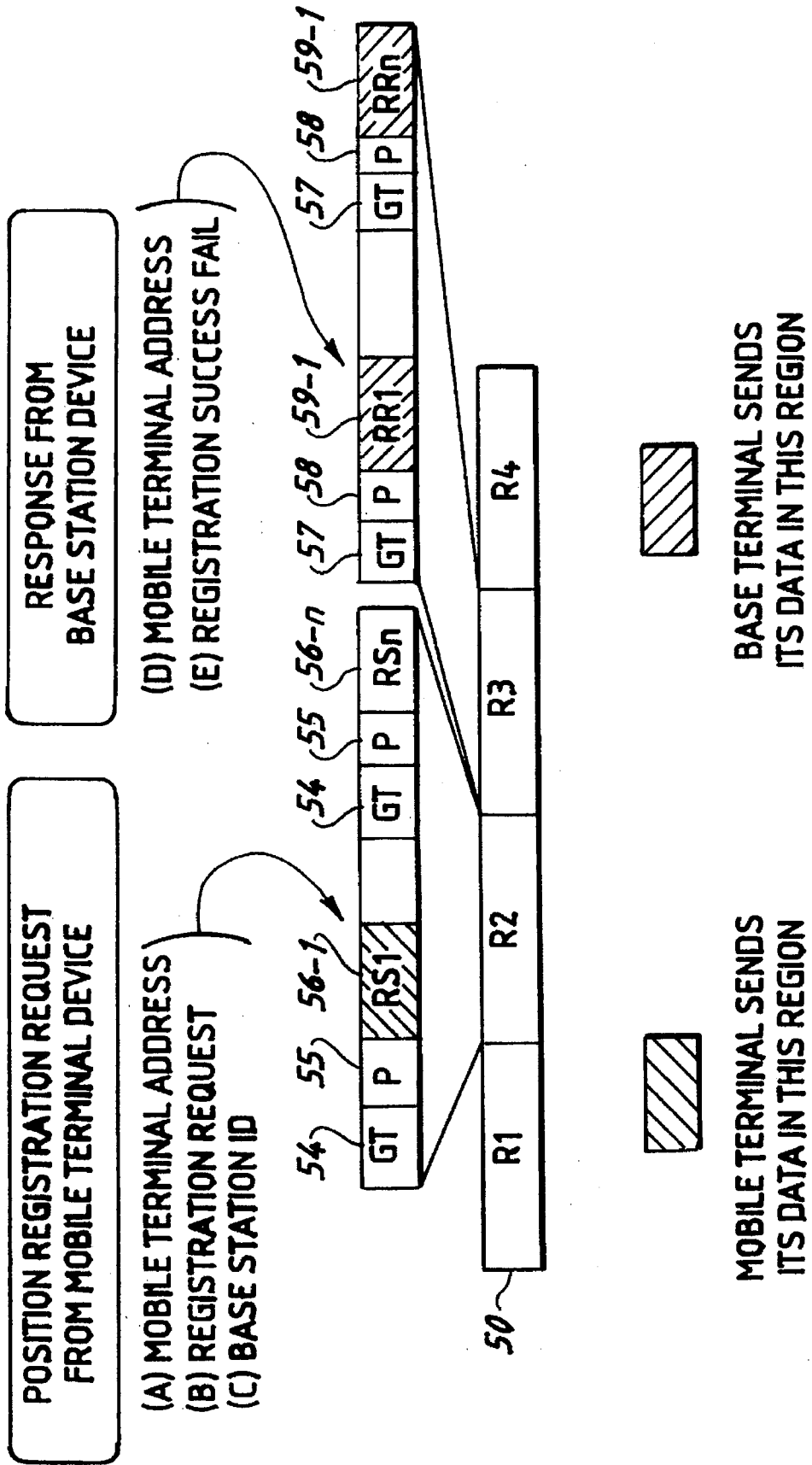

1

WIRELESS LAN SYSTEM CAPABLE OF RE-TRANSMISSION UNDER MANAGEMENT OF A BASE STATION DEVICE TO A DESTINATION MOBILE TERMINAL DEVICE

FIELD OF THE INVENTION

The present invention relates to a wireless local area network (LAN) system including mobile terminal devices and base station devices between which bidirectional wireless communication is possible.

BACKGROUND OF THE INVENTION

An example of a conventional control method for management of mobile terminal devices in a wireless communication network is disclosed in U.S. Pat. No. 5,212,806 (Japanese Patent Application Laid-open Gazette No. Hei 4-249443), entitled "Distributed Control Methods for Management of Migrating Data Communications Network". This patent relates to a managing method for mobile communication units in a wireless communication network having a plurality of header stations (corresponding to base station devices) performing bidirectional wireless communication with at least one mobile communication unit (corresponding to a mobile terminal device). The overall method includes (1) identifying method of header station, (2) selecting method of header station, (3) registration method of mobile communication units and (4) updating and erasing method of registration contents. Essentially, the header station maintains a database called the owner table for containing identities of mobile communication units and stores a new identity whenever the header station receives a message from a mobile communication unit.

By using these methods, it is possible to not only realize cross-over movement of the mobile communication unit from a cell but also effectively utilize a battery-powered mobile communication unit.

A further example of a conventional base station selecting method there is disclosed in Japanese Patent Application Laid-open Gazette No. Hei 1-256234, entitled "Base Station Selecting Circuity". This circuit is to measure, in a mobile terminal device, a signal power received from a base station device able to communicate therewith, to obtain a number of error occurrences in the received signal, and to select the base station by using a combination of evaluation references of the received signal power and the obtained number. According to this method, it is possible to control such that a mobile terminal can select a base station device as an owner of which communicating condition with the mobile terminal device is optimum.

These conventional techniques, however, do not disclose (1) performing a re-transmission to a mobile communication unit under management of the header station, or (2) controlling the number of mobile communication units which can subscribe to the header station.

An object of the present invention is to provide a wireless LAN system capable of performing a re-transmission by a base station device and a control method thereof.

Another object of the present invention is to provide a wireless LAN system capable of limiting subscription of mobile terminal devices for a base station device and a control method thereof.

A further object of the present invention is to provide a wireless LAN system capable of correctly selecting a communicable base station device and having high communication efficiency and a control method thereof.

SUMMARY OF THE INVENTION

In order to achieve the above mentioned objects, the present invention utilizes a wireless network having mobile terminal devices, base station devices in wireless communication with the mobile terminal devices, and a wired LAN connecting between the base station devices. The base station devices have a mobile terminal confirming database for registering the identities of those mobile terminal devices allowed to be subscribers for the wireless network, and a mobile terminal managing database for registering the identities of presently-managed mobile terminal devices. A wireless transfer request received by the base station through a wireless communication from one of the mobile terminal devices is tested to determine whether the request-issuing mobile terminal device is one of the subscribers. If the request is accepted, the identification of the request-issuing mobile terminal device is registered into the managing database.

Further, in the present invention, the mobile terminal device and the base station device each includes means for detecting a frame synchronization of a receiving signal and means for counting packet disuse occurrences (error occurrences) of the received signal so that receivability or unreceivability is determined by using a detection result of the frame synchronization, or the counted number.

The base station device executes re-transmission to only the mobile terminal devices registered in the mobile terminal managing database. Therefore, no re-transmission is performed to mobile terminal devices which are out of management of the base station device, and thus redundant communication is eliminated.

The base station device references the mobile terminal managing database and the mobile terminal confirming database and allows registration in the mobile terminal managing database of only those mobile terminal devices already registered in the mobile terminal confirming database. Therefore, the number of mobile terminal devices under management of the base station device can be limited, and thus collision of transmission requests between mobile terminal devices is minimized. Further, the mobile terminal device and the base station device determine a receiving condition by using the detection result of frame synchronization and the counted number of the packet disuse occurrences (error occurrences) of the received signal. Thus, error in the determination of receivability and unreceivability is minimized.

BRIEF DESCRIPTION OF THE DRAWINGS

FIG. 13 shows a list of receiving response operations in the communication procedure.

FIG. 18 shows a communication frame position to be used in registering position.

FIG. 19 shows a communication frame position to be used in an intra-cell communication between a mobile terminal device and a base station device.

DESCRIPTION OF THE PREFERRED EMBODIMENT

Figure 1:
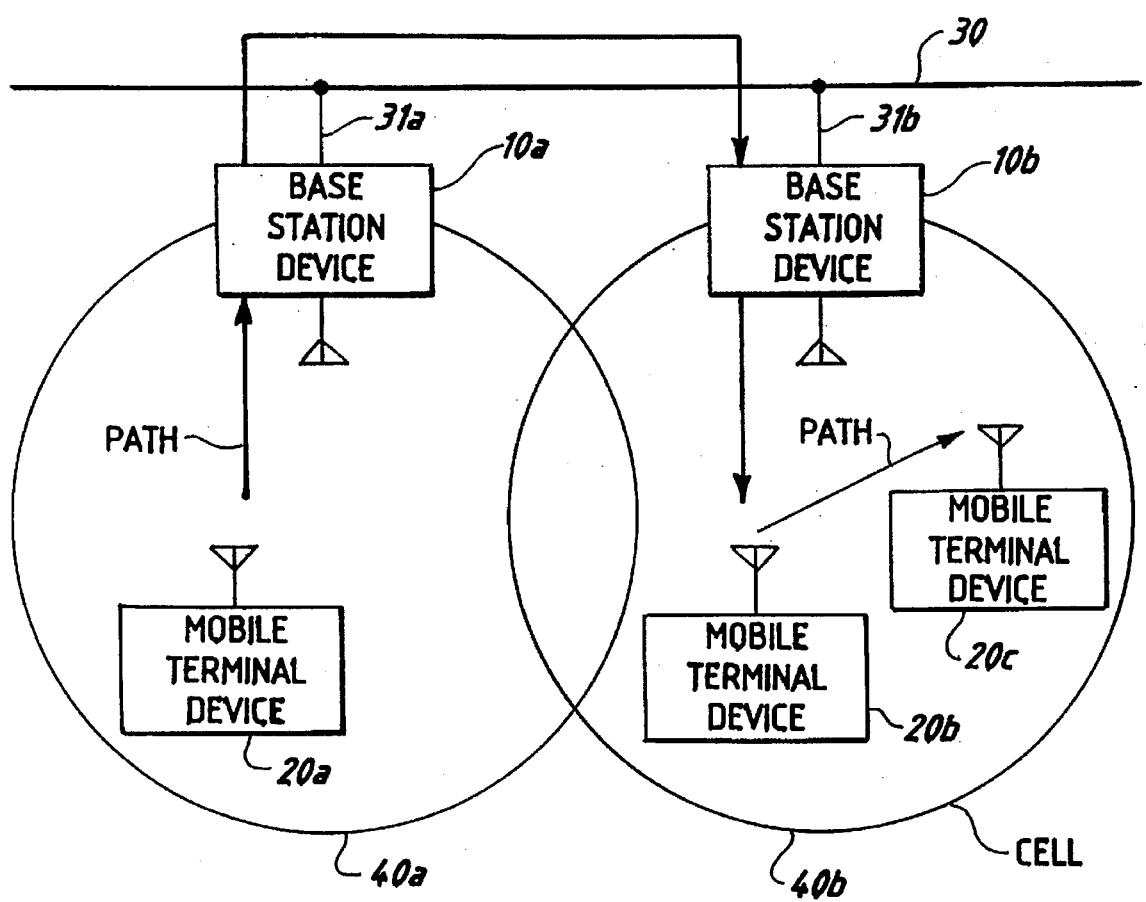
FIG. 1 shows the general construction of an embodiment of a wireless LAN system in which a control method according to the present invention is implemented.

The preferred embodiments of the present invention will be described with reference to the drawings. FIG. 1 shows the overall construction of a wireless LAN system according to the present invention. The wireless LAN system is constructed with base station devices 10a and 10b and mobile terminal devices 20a, 20b and 20c which are capable of performing bidirectional wireless communication and a wired LAN 30 for communication between the base station devices 10a and 10b. The base station devices 10a and 10b are connected to the wired LAN 30 through connectors 31a and 31b, respectively. Cells 40a, 40b are managing areas of the base station devices 10a and 10b, respectively. The base station device 10a and the mobile terminal device 20a in the cell 40a or the base station device 10b and the mobile terminal devices 20b and 20c in the cell 40b use a frequency specific to the cell unit to realize an intra-cell communication. Communication between mobile terminal devices 20a, 20b and 20c is performed through path a between mobile terminal devices such as the mobile terminal devices 20b and 20c which are in the same cell, and is performed through path b between mobile terminal devices such as the mobile terminal devices 20a and 20b which are in different cells.

Figure 2:
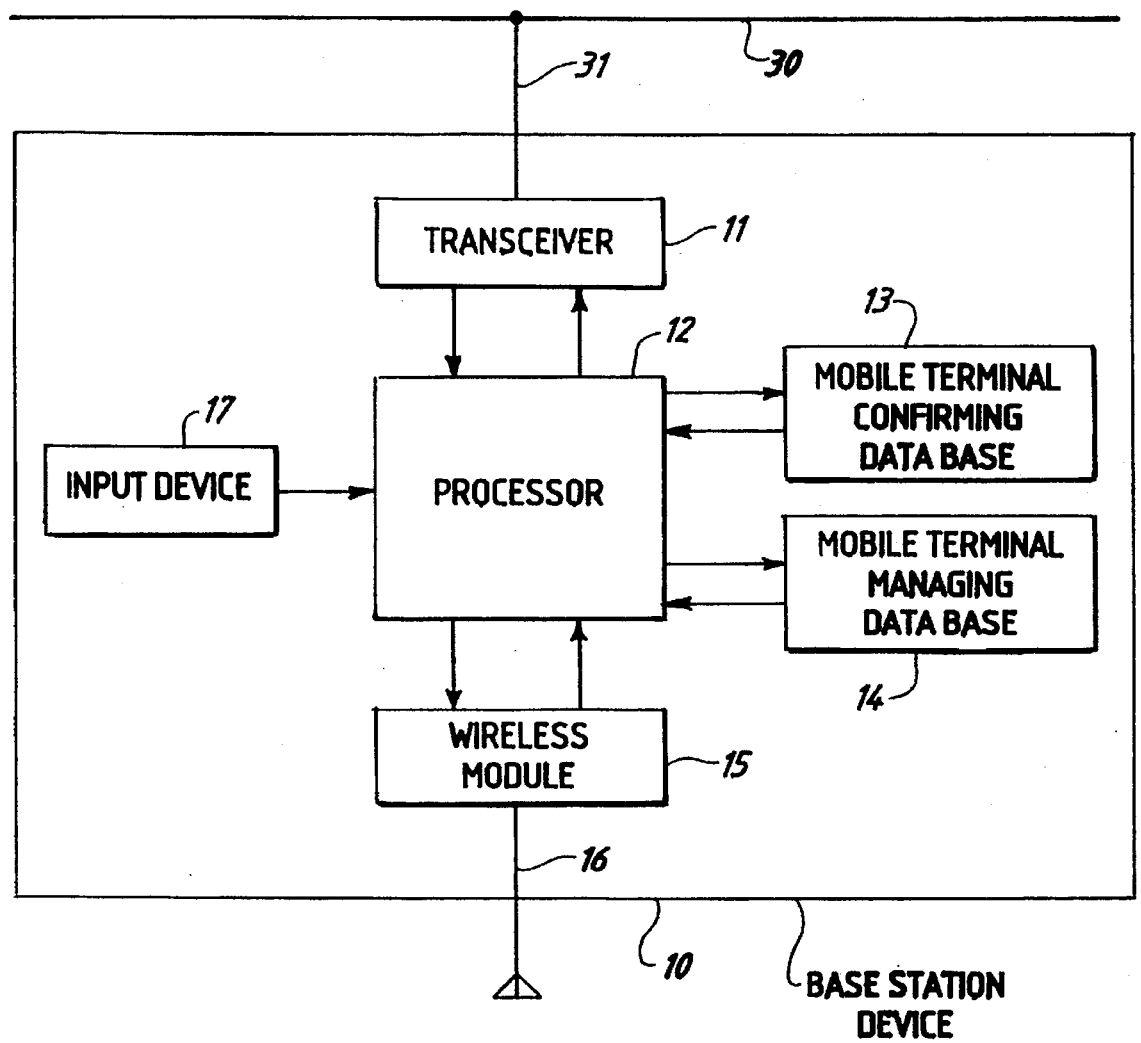
FIG. 2 shows a schematic of a base station device of a wireless LAN system of the present invention.

FIG. 2 shows schematically a construction of an embodiment of the base station device 10 shown in FIG. 1. In the same figure, the base station device 10 is connected to the wired LAN 30 through the connector 31. The connector 31 is connected to a transceiver 11 which is, in turn, connected to a processor, 12. Further, the base station device 10 has a mobile terminal confirming database 13 registering mobile terminal devices 20 which are allowed as subscribers of the wireless network, and a mobile terminal managing database 14 registering mobile terminal devices which are under management of the base station device 10. The mobile terminal confirming database 13 and the mobile terminal managing database 14 are bidirectionally connected to the processor 12. An initial setting of the mobile terminal confirming database 13 is performed from an input device 17. That is, before a communication is started between the base station device 10 and the mobile terminal device 20, all mobile terminal devices 20 which are allowed to subscribe to the wireless network are registered in the mobile terminal confirming database 13 from the input device 17 of the base station 10. Further, a modulating/demodulating processing is performed in a wireless module 15 connected to the processor 12 and a communication with respect to the mobile terminal devices 20 is performed through an antenna 16.

Figure 15:
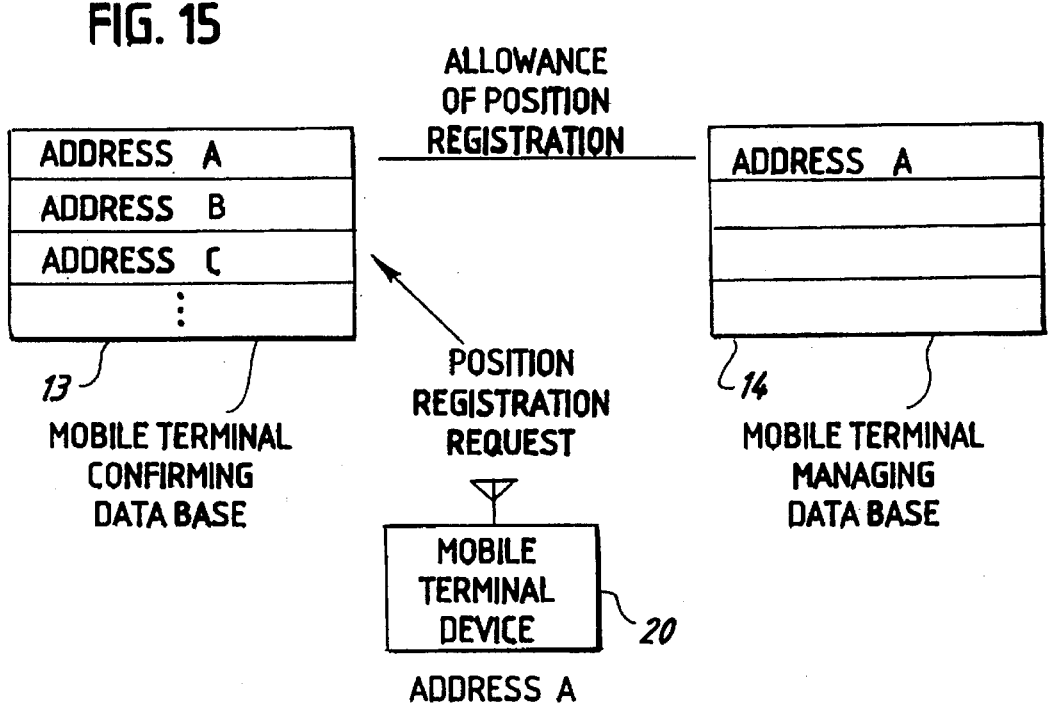
FIG. 15 shows the use of a mobile terminal confirming database and a mobile terminal managing database when provided separately.

FIG. 15 shows how to use the mobile terminal confirming database 13 and the mobile terminal managing database 14. First, as shown in FIG. 15, media accessories control (MAC) addresses (referred to hereinafter as simply "addresses") to all of the mobile terminal devices 20 which have been allowed as subscribers to the wireless network are written in the mobile terminal confirming database 13. When a mobile terminal device 20a requests to a base station device 10 a position registration (position registration will be described in detail later) after the above processing is completed, it is checked whether an address of the mobile terminal device 20a is registered in the mobile terminal confirming database 13 and, if the mobile terminal device 20a is registered therein, the address of the mobile terminal device 20a is registered in the mobile terminal managing database 14 and the position registration is completed.

Figure 16:
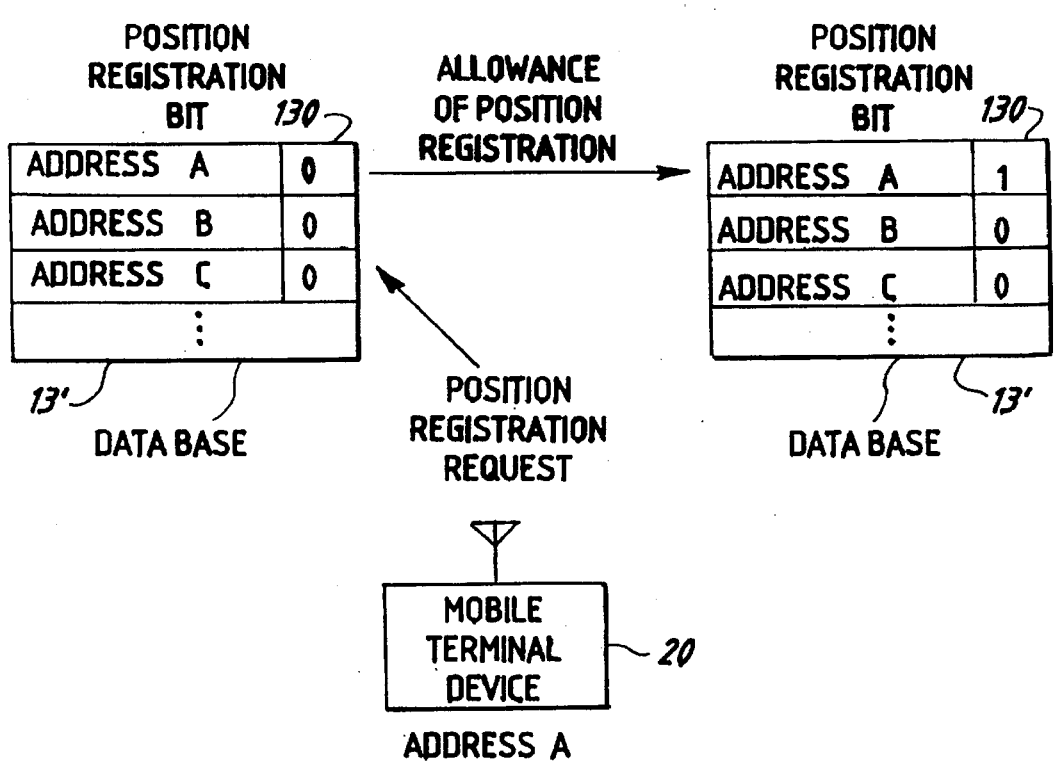
FIG. 16 shows the use of a mobile terminal confirming database and a mobile terminal managing database when provided integrally.

Although in the above description, the mobile terminal confirming database 13 and the mobile terminal managing database 14 are provided separately, it is alternatively possible to provide a database 13' which is a combination of them. In the latter case, the addresses of all of the mobile terminal devices 20 which are allowed as subscribers of the wireless network are written in the database 13' and simultaneously a position registration bit 130 is provided at a position after the address is invalidated (for example, 0), as shown in FIG. 16. When a mobile terminal device 20a requests a position registration to a base station device 10 after the above mentioned procedures are completed, it is checked whether the address of the mobile terminal device 20a is registered in the database 13', and, if the mobile terminal device 20a is registered, the position registration bit 130 attached to the end of the address in the database 13', corresponding to the mobile terminal device 20a, is validated (for example 1), completing the position registration.

Figure 20:
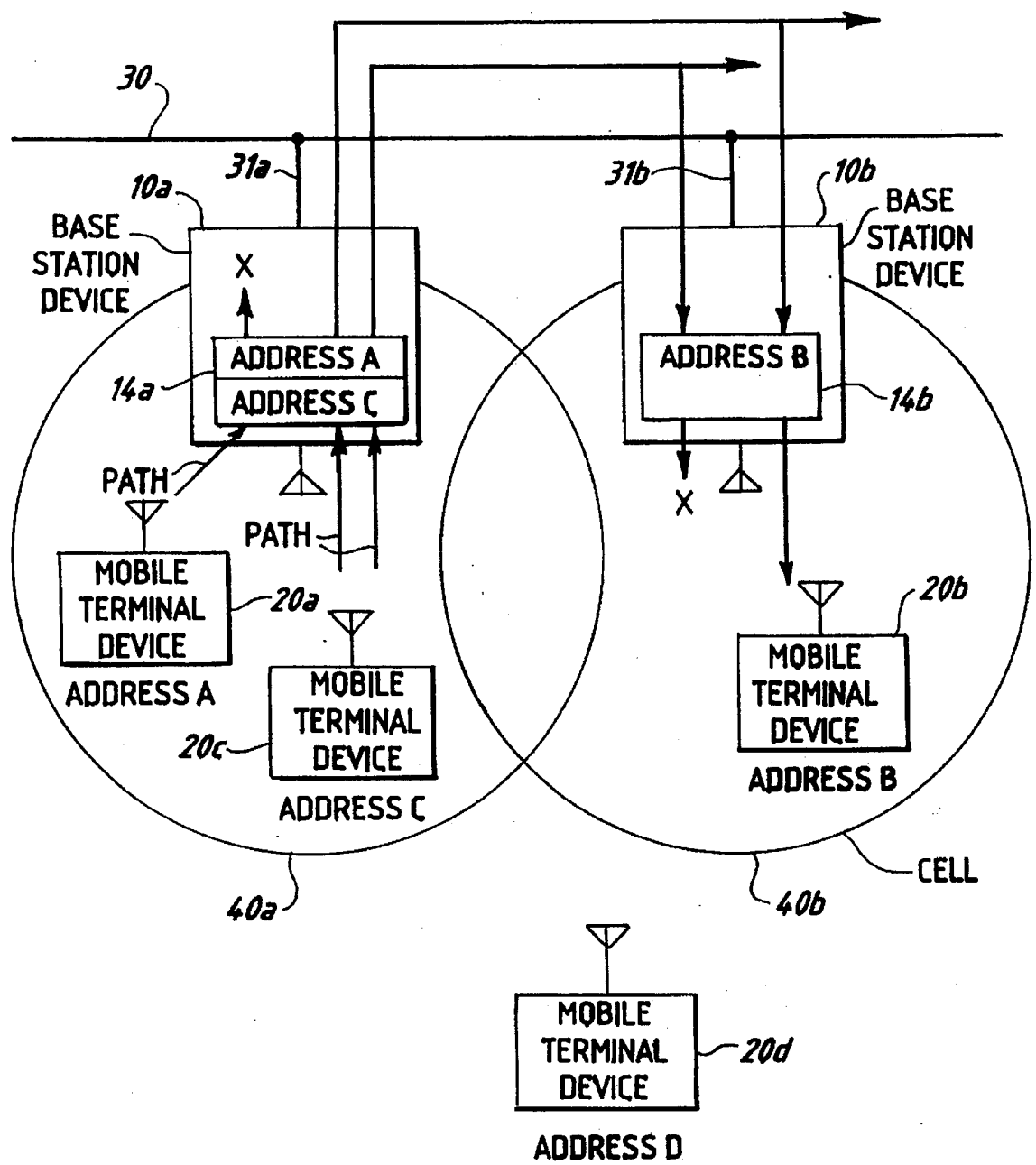
FIG. 20 shows a filtering function of a base station device of the present invention.

The mobile terminal managing database 14 cooperates with the processor 12 and is used to perform a filtering function. That is, the mobile terminal managing database 14 has a function of limiting the transfer of packets transmitted from the mobile terminal devices 20 under management of the base station 10 and packets received from the wired LAN 30. FIG. 20 is useful to understand the filtering function. FIG. 20 shows mobile terminal devices 20a, 20b and 20c whose position registrations in the mobile terminal managing database 14 in the base station 10 are completed.

In FIG. 20, path a shows processing of the mobile terminal managing database 14 when a communication is performed from mobile terminal device 20a to mobile terminal device 20c. In this case, an address c is set in a destination address of data. The destination address is checked in a mobile terminal managing database 14a. Since the mobile terminal managing database 14a confirms, from the fact that the address c is registered in its own database, that the mobile terminal device 20c is included therein, it does not send this data to the wired LAN 30. However, data is held therein for re-transmission by means of the base station device 10 as to be described later. In the usual case, data sent from the mobile terminal device 20a is directly received by the mobile terminal device 20c.

Path b in FIG. 20 shows processing of mobile terminal managing databases 14a and 14b when a communication is performed from mobile terminal device 20c to mobile terminal device 20b. In this case, an address b is set as a destination address of data. The destination address is checked in the mobile terminal managing databases 14a and 14b. Since the mobile terminal managing database 14a confirms, from the fact that the address, b is not registered in its own database, that the mobile terminal device 20b is not included therein, it sends this data to the wired LAN 30. However, since the mobile terminal managing database 14b confirms, from the fact that the address b is registered in its own database, that the mobile terminal device 20b is included therein, it sends this data to mobile terminal devices in its service area, cell 40b.

Path c shows processing of the mobile terminal managing databases 14a and 14b when a communication is performed from the mobile terminal device 20c to a mobile terminal device 20d which does not exist in the cells 40a and 40b. In this case, an address d is set as a destination address of data. The destination address is checked in the mobile terminal managing databases 14a and 14b. Since the mobile terminal managing database 14a confirms, from the fact that the address d is not registered in its own database, that the mobile terminal device 20d is not included therein, it sends this data to the wired LAN 30. However, since the mobile terminal managing database 14b confirms, from the fact that the address d is not registered in its own database, that the mobile terminal device 20d is not included therein, it does not send this data to its cell 40b.

Figure 3:
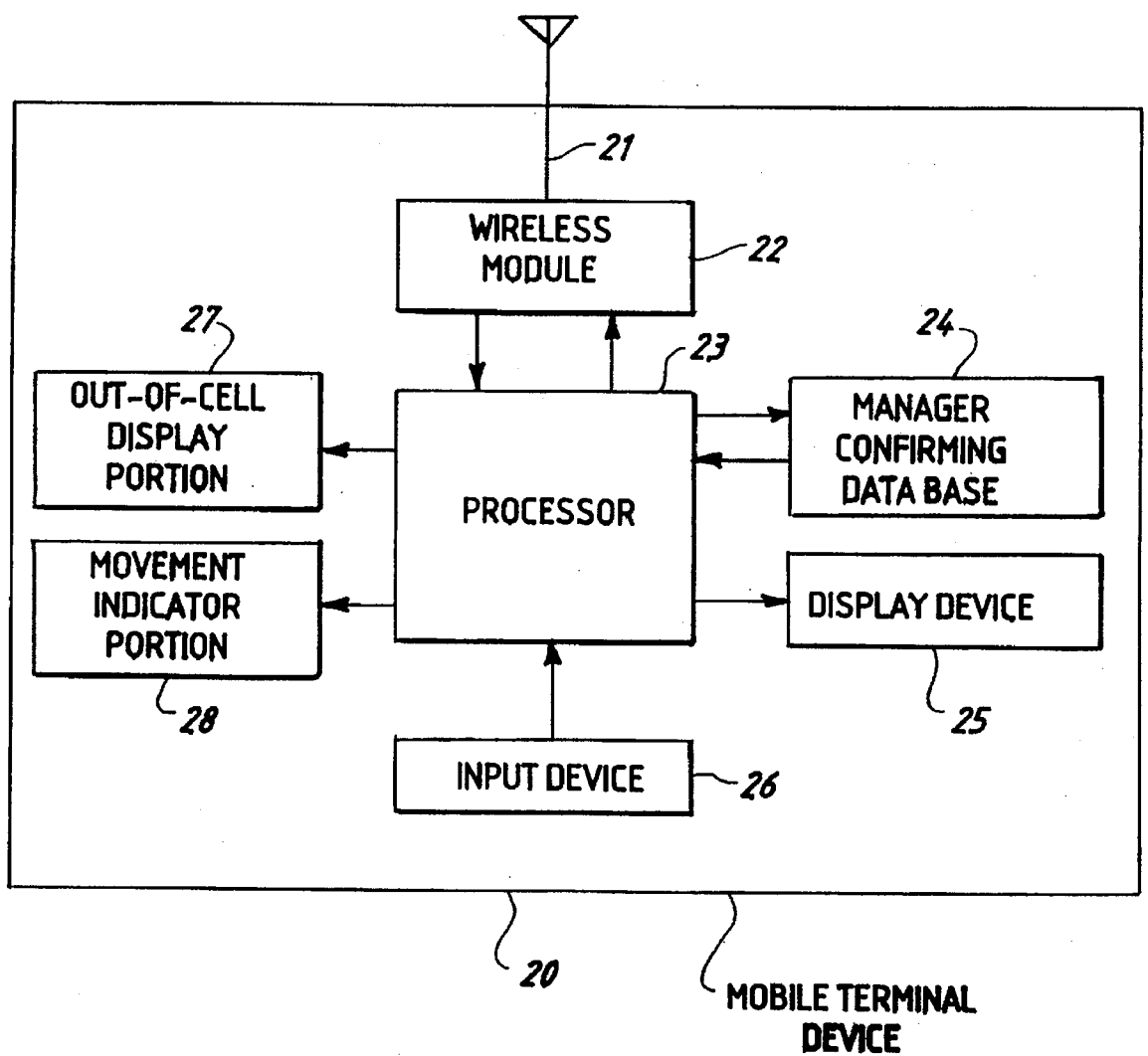
FIG. 3 shows a schematic of a mobile terminal device of a wireless LAN system of the present invention.

FIG. 3 shows schematically an embodiment of the mobile terminal device 20 shown in FIG. 1. The mobile terminal device 20 includes a processor 23 connected to a manager confirming database 24 registering a base station (not shown) which is the manager of the mobile terminal device 20, a display device 25, an input device 26, an out-of-cell display portion 27 and a movement indicator portion 28. A modulation and demodulation processing is performed in a wireless module 22 connected to the processor 23 and a communication to the base station device 10 or other mobile terminal devices 20 is performed through an antenna 21.

Figure 17:
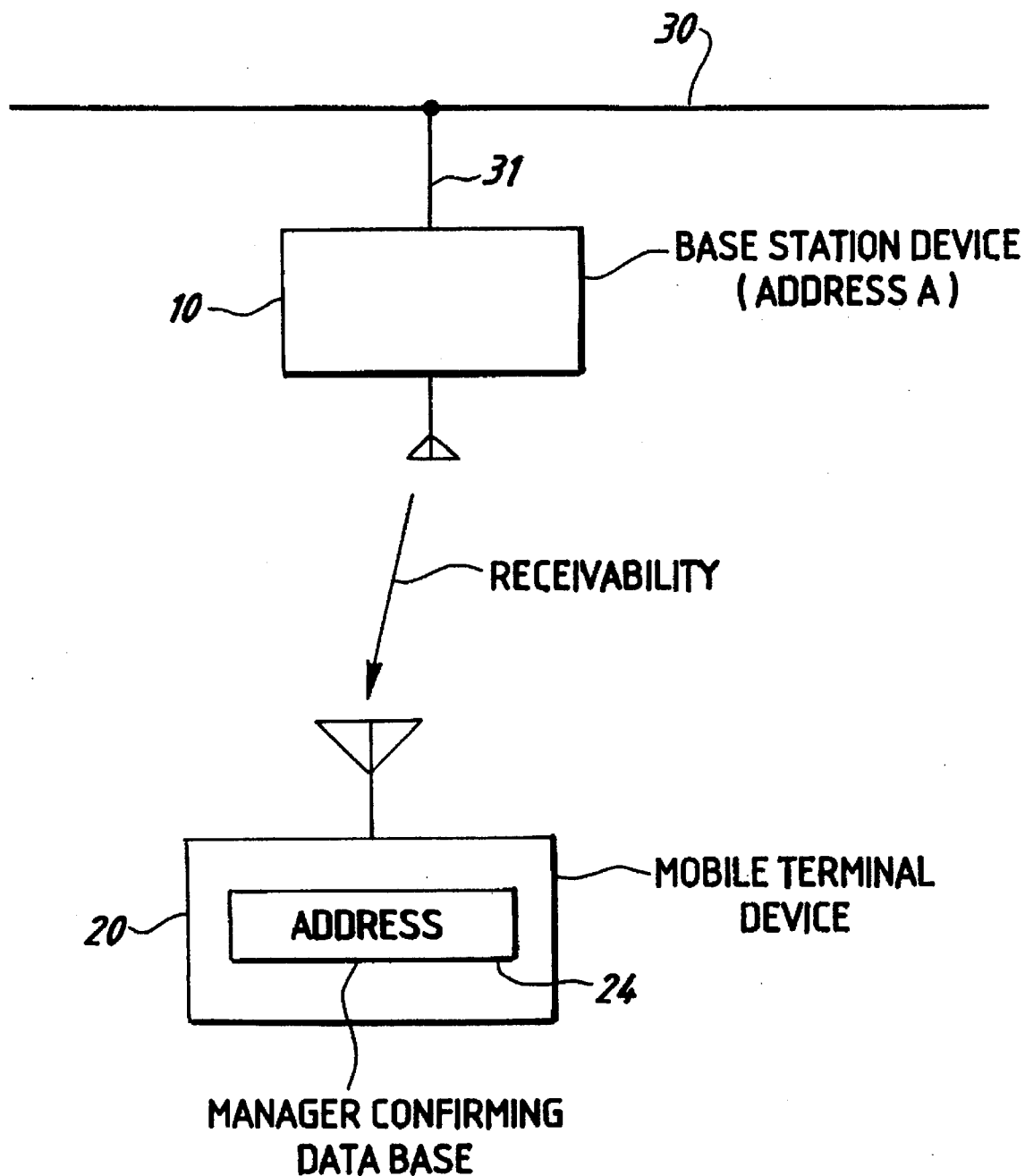
FIG. 17 shows a manager confirming database.

FIG. 17 shows how to use the manager confirming database 24. In order to confirm the base station to which the mobile terminal device 20 belongs, the latter mobile terminal device 20 stores an identifier of the base station device 10 in the manager confirming database 24 after the receivability of the signal transmitted by the base station device 10 is confirmed. This identifier may be, for example, an address of the base station device 10 or identification patterns respectively given to the respective base station devices 10 within the wireless network system.

Figure 4:
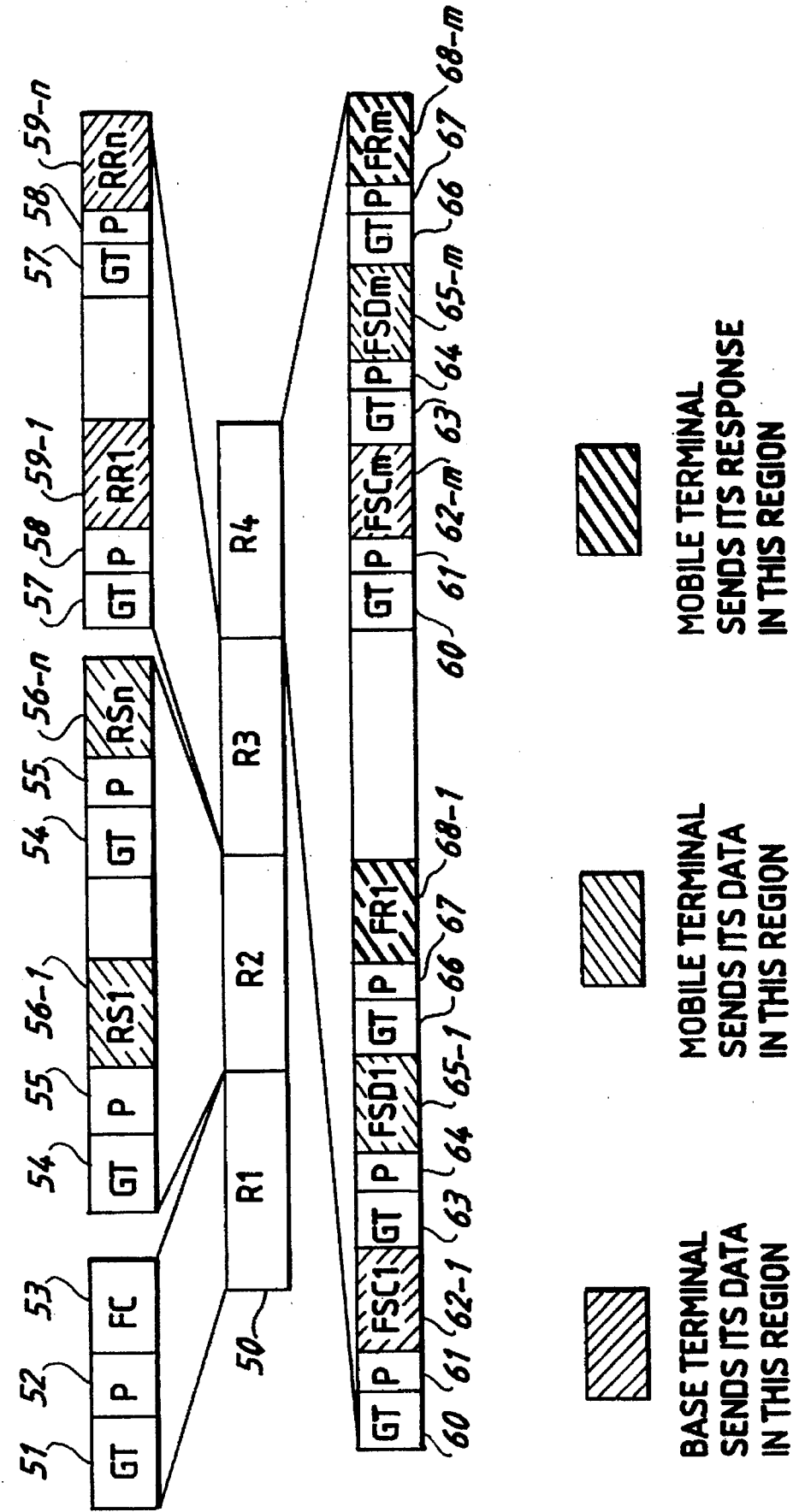
FIG. 4 shows a communication frame used in a wireless LAN system of the present invention.

FIG. 4 shows a communication frame used in a wireless communication in the system according to the present invention. A communication frame 50 is composed of a frame control region R1, a request slot region R2, a request response region R3 and a fragment slot region R4. The base station device 10 determines a frame timing.

First, the frame control region R1 is includes a protection region (GT) 51, preamble (P) 52 and a frame control (FC) 53. The protection region (GT) 51 is used to regulate deviation of timing between the mobile terminal devices 20 caused due to differences in the propagation distances from the base station device 10 to the respective mobile terminal devices 20. The preamble (P) 52 is used to synchronize the base station 10 (which is a transmitter) and the mobile terminal device 20. In the preamble (P) 52, a fixed pattern of "1, 0, 1, 0, 1 . . . " which contains the maximum amount of clock timing information is used set. The frame control (FC) 53 is to store a fixed pattern for identifying a lead position of the frame and frame control information such as the number of request slots. On receipt of the frame control 53 the mobile terminal device 20 realizes where the lead position is, which is obtained by subtracting the time duration of the protection region 51 and the preamble 52 from the receipt point of the frame control 53.

All of the mobile terminal devices 20 in a cell derive the clock of the base station device 10 in their wireless module 22 from the pattern of the preamble (P) 52 detected at the lead portions of the respective communication frames 50 by using a phase locked loop (PLL) to thereby synchronize (frame synchronize) with respect to the base station device 10.

The respective mobile terminal devices 20 count clocks from the frame control (FC) 53 to identify borders between respective regions of the communication frame 50 and between the slots.

Next, the request slot region R2 includes a protection region (GT) 54 which functions similarly to the above mentioned protection region (GT) 51, a preamble (P) 55 which functions similarly to the above mentioned preamble (P) 52, and request information setting regions (RSi) 56 i (i=1, . . . , n). The mobile terminal device 20 uses an arbitrary request information setting region (RSi) to set one request for one message so that the mobile terminal device 20 can transfer to the base station device 10 a request for assignment for transmission right or a registration request (position registration) to the mobile terminal managing database 14.

The request response region R3 includes a protection region (GT) 57 which functions similarly to the above mentioned protection region (GT) 51, a preamble (P) 58 which functions similarly to the above mentioned preamble (P) 52, and response information setting regions (RRi) 59–i (i=1, . . . , n). These response information setting potions (RRi) 59–i (i=1, . . . , n) are used to set the response of the base station device such as assignment of requested transmission right as requested by the mobile terminal device 20, or successful receiving or unsuccessful receiving (ACK, NAK) with respect to the position registration, etc., and to notify the mobile terminal device 20 the content. A response to the request information setting regions (RSi) 56–i (i=1, . . . , n) of the request region R2 is performed in these response information setting regions (RRi) 59–i (i=1, . . . , n) of the request response region R3 with 1:1 correspondence, respectively.

Finally, the fragment slot region R4 includes fragment slot control regions (FSCi) 62–i (i=1, . . . , m), fragment slot transmission regions (FSDi) 65–i (i=1, . . . , m) and fragment response regions (FRi) 68–i (i=1, . . . , m), which are paired respectively. Similar protection regions (GT) 60, 63 and 66 and preambles (P) 61, 64 and 67 are provided for these respective regions.

The base station device 10 notifies the media access control (MAC) address of the mobile terminal device 20 to which the transmission right of the fragment slot transmission regions (FSDi) 65–i (i=1, . . . , m) immediately following the fragment slot control regions (FSCi) 62–i (i=1, . . . , m) is given, by using the latter fragment slot control regions. The mobile terminal device 20 to which the transmission right of the fragment slot transmission regions (FSDi) 65–i (i=1, . . . , m) immediately preceding the fragment slot control regions (FSCI) 62–i (i=1, . . . , m) is given transmits the MAC address of another destination mobile terminal device and the transmission data to the fragment slot transmission regions (FSDi) 65–i (i=1, . . . , m). Further, the destination mobile terminal device notifies a receiving result of the immediately preceding fragment slot transmission regions (FSDi) 645–i (i=1, . . . , m) to the base station device 10 by using the fragment response regions (FRi) 68–i (i=1, . . . m).

Figure 5:
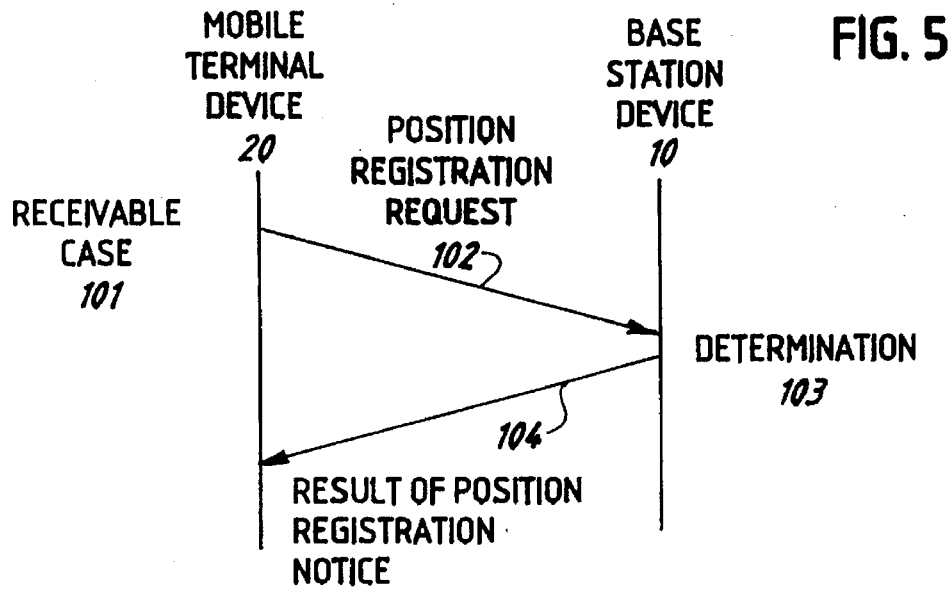
FIG. 5 shows a position registration procedure to be performed between a mobile terminal device and a base station.

FIG. 5 shows a communication procedure case where a mobile terminal device 20 in a wireless LAN system of the above mentioned embodiment requests a position registration. The mobile terminal device 20 periodically monitors the content of the manager confirming database 24 and enters into a position registration request whenever the content is erased. This may correspond to, for example, turning on a power source or cross-over movement from a cell. First, the mobile terminal device 20 detects whether the communication frame 50 sent from the base station device 10 is receivable and is shifted to a position registration request 102, that is, a registration request is made to the mobile terminal managing database 14 only in a receivable case 101.

Before describing the position registration request, the determination of a receiving condition will be described. The base station device 10 employs the same method for determination of receiving condition as the mobile terminal device 20. In the wireless LAN system of this embodiment, a result of the determination made in the control channel is not used in a data transfer channel, unlike the mobile communication system. Rather, the receiving condition is determined in a channel through which data transfer is performed. The wireless modules 15, 22 of the base station device 10 and mobile terminal device 20, respectively, perform the determination of receiving condition using the detection result of frame synchronization and the error occurrence number of the receiving signal. That is, the signal is determined as receivable when the frame is synchronized as mentioned previously and the error occurrence number of the receiving signal is not more than a certain threshold value; otherwise, the signal is determined as unreceivable. The error occurrence number of receiving signal is obtained by, for example, a result of an error detection using CRC code which is an error detection code provided within a communication frame. In practice, it may be possible to determine that the threshold value is reached when there are g (g>1) CRC errors or more in one frame.

Instead of this error occurrence number, it is possible to use the error percentage of the receiving signal. In such case, a fixed pattern for percentage error measurement is provided in the communication frame and percentage error of this fixed pattern is measured. Further, although in the above description the receiving condition is determined by using both the detection result of frame synchronization and the error occurrence number of the receiving signal, it is possible to determine the receiving condition by using either the detection result of frame synchronization or the error occurrence number of the receiving signal.

The mobile terminal device 20 which becomes receivable as mentioned above stores the identifier of the base station device 10 in the manager confirming database 24 in order to identify the base station device 10. The content of the manager confirming database 24 is erased when the power source of the mobile terminal device 20 is removed or when an unreceivable condition continues as will be described later.

As to a method of requesting position registration, the mobile terminal device 20 sets a request for information in any of the request regions RSi (i=1, . . . , n) of the request region R2 of the communication frame 50 (this will be referred to as the position registration request step 102). As shown by RS1 in FIG. 18, (a) an address of the mobile terminal device 20 from which transmission is made, (b) information indicative of a registration request to the mobile terminal managing database 14 and (c) an identifier identifying the base station device 10 to which the registration request is made and stored in the manager confirming database 24, are set in the request information.

The base station device 10 checks respective requests of the request region R2 and determines whether position registration is to be executed (103). For the mobile terminal devices 20 which have been registered in the mobile terminal confirming database 13, position registration is performed and the completion of position registration is notified to the mobile terminal devices 20 by using the response information setting regions (RRi) 59 1, . . . , n). On the other hand, position registration of the mobile terminal devices 20 which are not registered in the mobile terminal confirming database 13 is not performed and these mobile terminal devices are notified of the fact of position registration rejection by means of the response information setting regions (PRi) 59–i (i=1, . . . , n) (the procedure mentioned above is called position registration notice step 104). As shown by PR1 shown in FIG. 18, (d) address of the mobile terminal device requesting position registration and (e) success or fail of position registration are set in the response information setting region (PRi) 59–i (i=1, . . . , n). According to this procedure, it becomes possible to limit subscription of the mobile terminal devices 20 for the base station 10.

Figure 6:
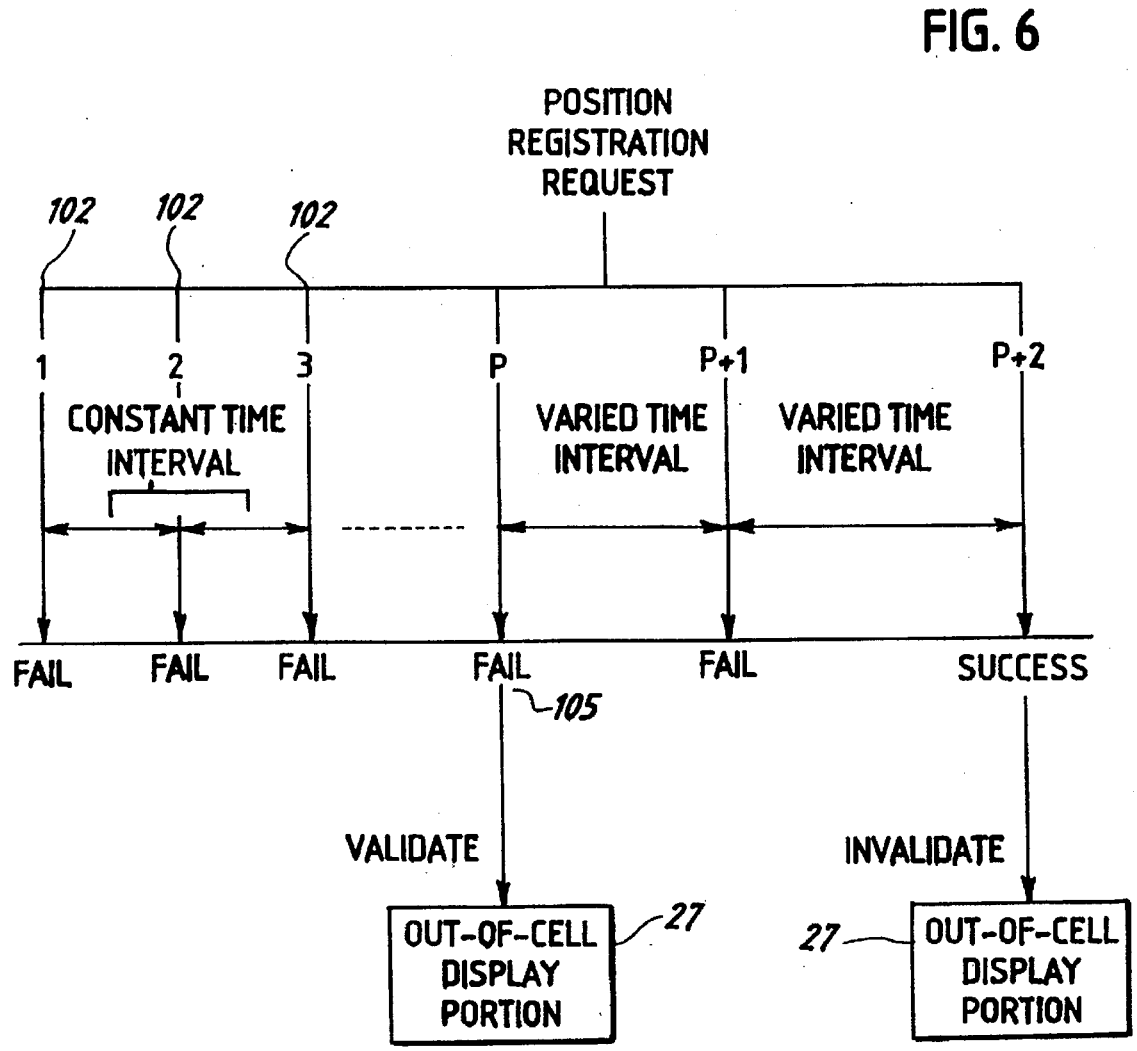
FIG. 6 shows the timing for a position registration request of a mobile terminal device.

The mobile terminal devices 20 which failed position registration repeatedly request the position registration to the base station device 10 at a constant time interval such as position registration request 1 (102a), position registration request 2 (102b) and position registration request 3 (102c) shown in FIG. 6. At this time, when the mobile terminal device 20 fails the position registration p times (p>1) without being registered in the mobile terminal managing database 14 (105), the out-of-cell display portion 27 is made valid and the (p+1)th or subsequent position registration request is stopped. Alternatively, instead of stoppage of the (p+1)th or subsequent position registration request as shown in FIG. 6, the time interval for the (p+1)th or subsequent position registration request is changed, and, when the (p+1)th or subsequent position registration request is successful, the out-of-cell display portion 27 is made invalid. Usually, in order to restrict power consumption of the mobile terminal device 20, the time interval is set longer with time. Also, in a case where the power source of the mobile terminal device 20 is cut, the out-of-cell display portion 27 is made invalid.

Figure 7:
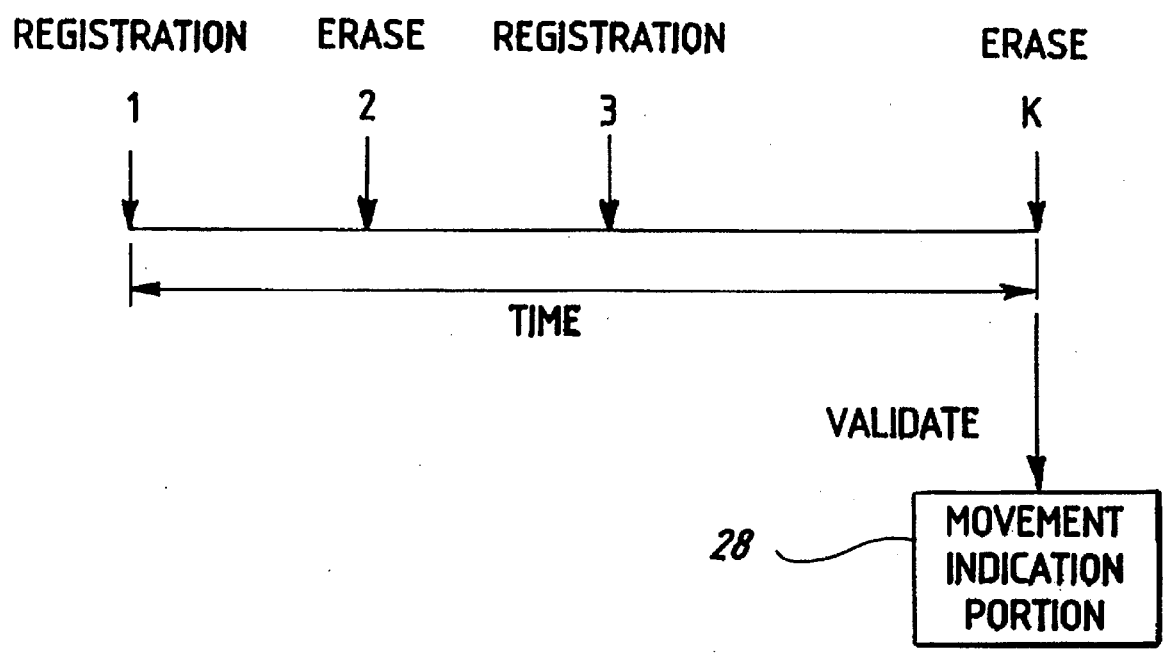
FIG. 7 shows the timing for the control of a movement indicator portion provided in a mobile terminal device.

Further, as shown in FIG. 7, the base station 10 instructs the mobile terminal device 20 to make the movement indication portion 28 of the mobile terminal device 20 valid when registration or erase of the mobile terminal device 20 is performed k times (k>0) in the mobile terminal managing database 14 within a time j (where j>0). Validation of the movement indication portion indicates that the mobile terminal device is recommended to move to another place in order to have an optimum wireless communication condition. When the mobile terminal device 20 whose movement indication portion 28 is valid completes registration in the mobile terminal managing database 14, the movement indication portion 28 is made invalid. The movement indication portion 28 is also made invalid when the power source of the mobile terminal device 20 is cut. Although the mobile terminal device 20 enters into the procedure for position registration request to the mobile terminal managing database 14 at a time when it is detected, by periodically monitoring the content of the manager confirming database 24 to determine the content of the manager confirming database 24 is erased, it is possible to enable the mobile terminal device 20 to enter into the position registration request procedure manually by an input from the input device 26 regardless of the above-mentioned timing. Although the position registration information is notified to other base stations 10, details thereof will be described later.

Figure 8:
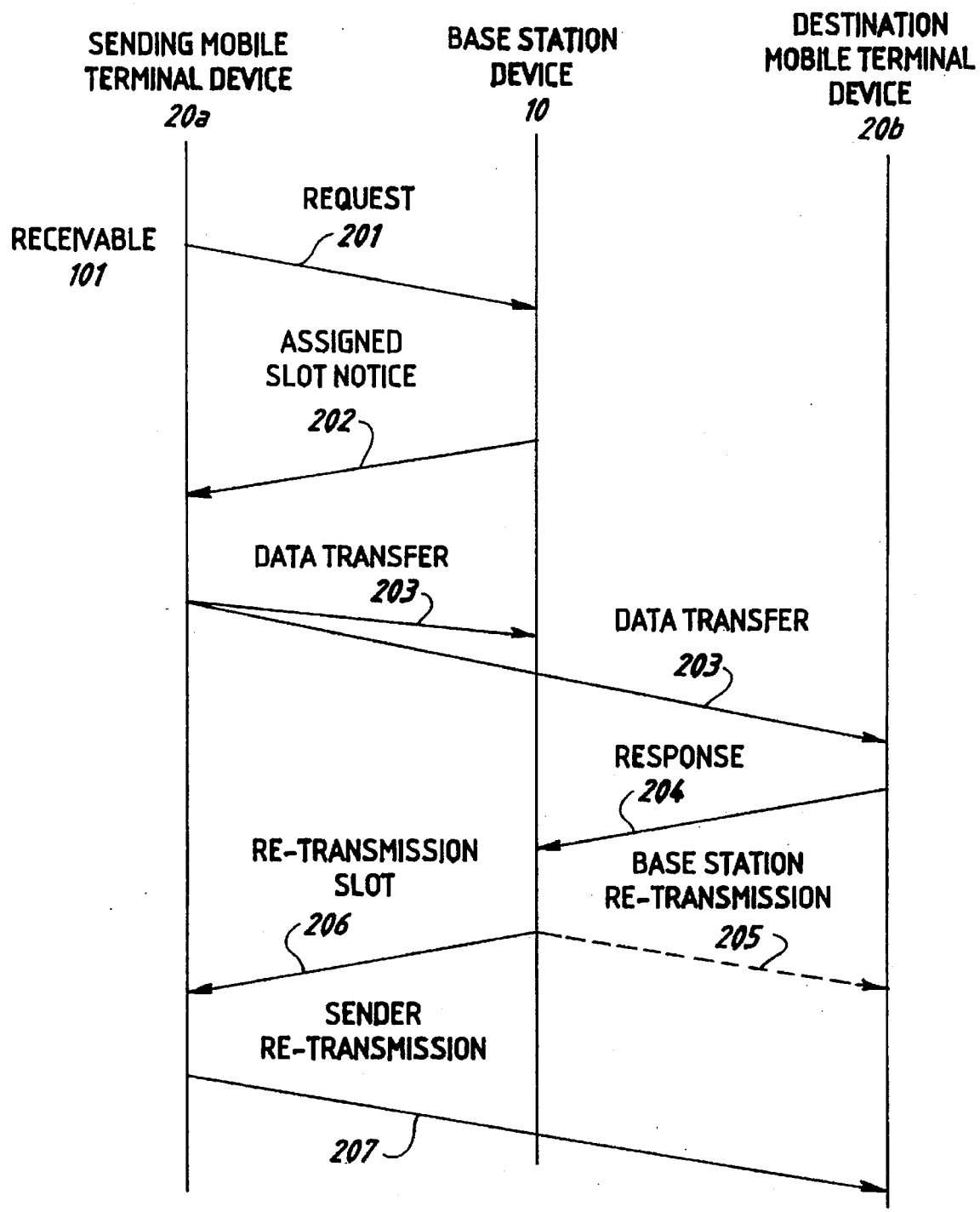
FIG. 8 shows a communication procedure in an intra-cell communication to be performed between a mobile terminal device and a base station device.

FIG. 8 shows a communication procedure where two mobile terminal devices 20 in the wireless LAN system perform an intra-cell communication. In FIG. 8, the sending mobile terminal device 20a transmits data to the destination mobile terminal device 20b. It is assumed that the mobile terminal device 20a enters into the transmission procedure only when it determines the receiving condition of the communication frame 50 sent from the base station 10 as receivable (101) as in the similar way to the above described position registration.

The mobile terminal device 20a sets a request information in any of the request regions RSi (i=1, ..., n) of the request region R2 of the communication frame 50 (this will be referred to as request send step 201). As shown by RS1 in FIG. 19, (a) an address of the sending mobile terminal device 20a, (b) information indicative of a request of transmission right, (c) an identifier identifying the base station device 10 to which the transmission right request is made and stored in the manager confirming database 24 and (d) the number of fragments necessary for transmission of one message (upper frame) are set in the request information.

Figure 9:
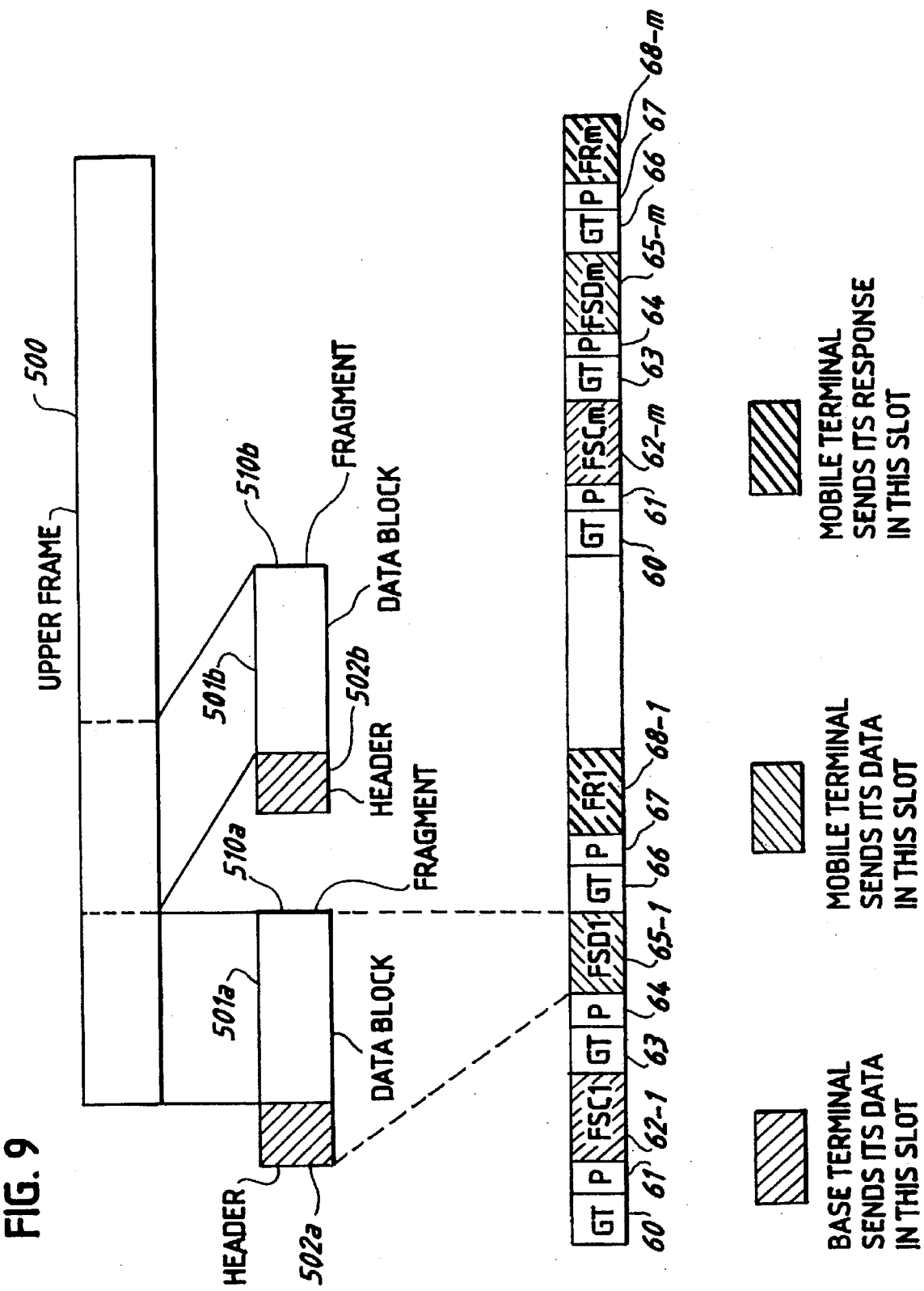
FIG. 9 shows the relationship between an upper frame and a fragment.

The upper frame will be described here. FIG. 9 shows a relation between a transmission message (upper frame) transmitted by the sending mobile terminal device 20 and a transmission information (fragment) output to the fragment slot. The upper frame 500 is divided into a plurality of data blocks 501a and 501b of a fixed length to which headers 502a and 502b are attached, respectively, to constitute fragments 510a and 510b. The fragment 510 is transmitted from the mobile terminal in the duration specified as a fragment slot transmission region FSDi shown in FIG. 4. In the wireless connection of the LAN terminal devices, the upper frame is usually a LLC frame defined by an interface between a logical link control (LLC) layer and a media access control (MAC) layer (IEEE 802 LAN CSMA/CD).

The base station device 10 checks the respective request information of the request region R2 and outputs, to a sending mobile terminal device address field defined in the header portion 502 of the respective fragment slots, the address of the mobile terminal device 20 which sent the request. That is, (e) the address of the mobile terminal device 20 to which the transmission right is given and (f) request success or fail are set in the PR1 in FIG. 19 and this information is sent to the mobile terminal device 20 (the above procedure is referred to as assigned slot notice step 202).

The base station device 10 sets in the FSC1 in FIG. 19 (g) the address of the mobile terminal device 20 which is allowed to transmit data and (h) an identifier for identifying new data of the mobile terminal device 20, a re-transmission of the base station device 10 or a retransmission of the sending mobile terminal device 20 and sends them. The sending mobile terminal device 20a whose request for transmission right is successfully accepted checks the received mobile terminal address in the respective fragment slots. When the mobile terminal device 20a detects an address destined thereto, it determines that an access to the fragment slot is allowed, except for the re-transmission by the base station device 10 to be described later, outputs the destination mobile terminal device 20b in the destination address field defined in the header portion of the fragment slot and outputs transmission data in the transfer information field of fixed length following the header portion (the above procedure is referred to as data transfer step 203). That is, the mobile terminal device 20 sets in the FSD1 in FIG. 19 (i) the address of the destination mobile terminal device 20, (j) the length of fragment information and (k) the transmission data, and transmits them. The transfered data is received by the mobile terminal device 20 having the specified destination address and the base station 10.

Figure 10:
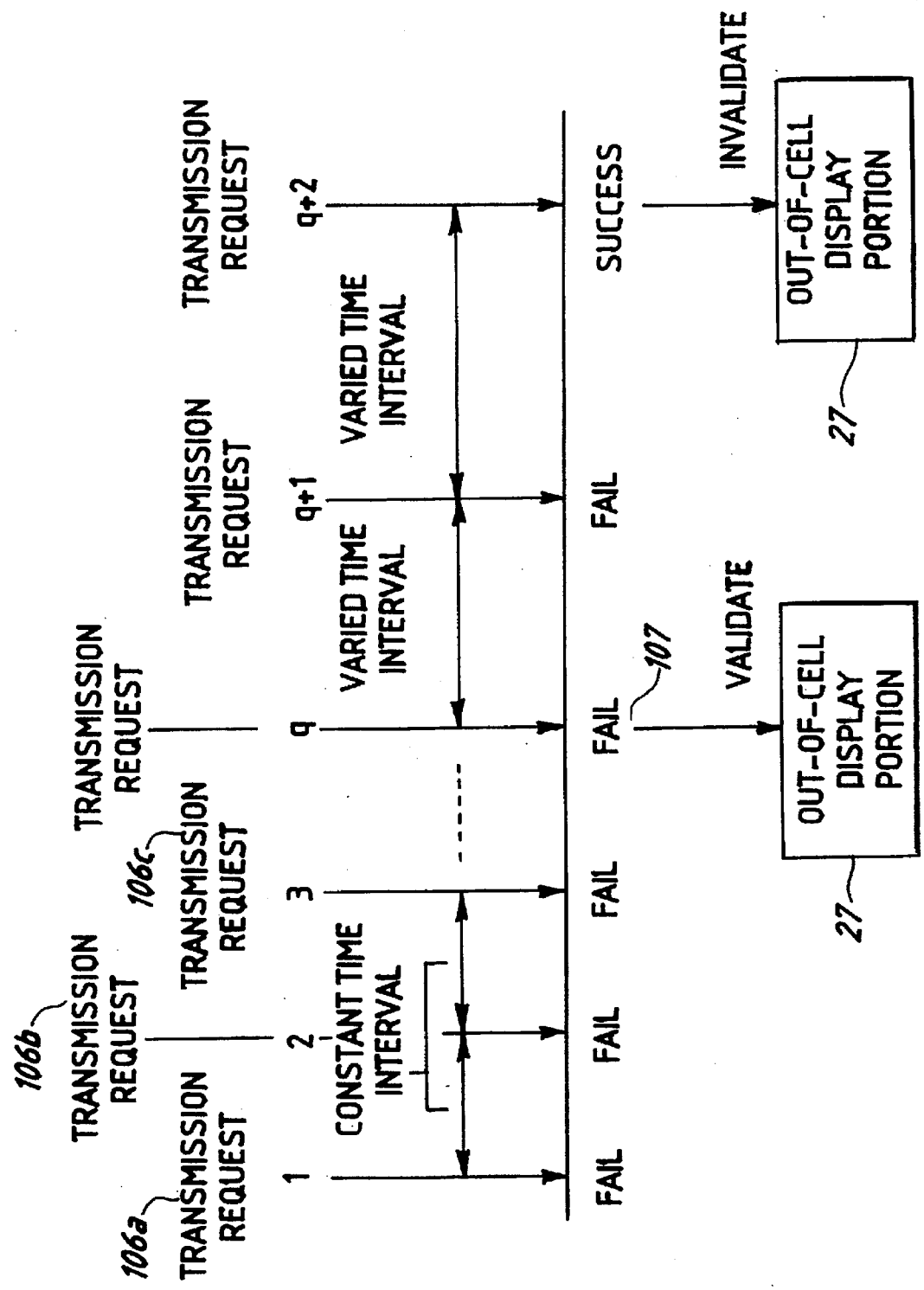
FIG. 10 shows the timing for a transmission request of a mobile terminal device.

On the other hand, when an address destined thereto is not detected, the transmission request is repeated at the constant time interval as shown by transmission request 1 (106a), transmission request 2 (106b) and transmission request 3 (106c) shown in FIG. 10. However, when the mobile terminal device 20 fails transmission request q times (where q>1) without permission of transmission (107), the out-of-cell display portion 27 is made valid and the (q+1)th or subsequent transmission requirement is stopped or a time interval of (q+1)th or subsequent transmission request is changed as shown in FIG. 10 without stopping the (q+1)th or subsequent transmission request and the out-of-cell display portion 27 is invalidated when the (q+1)th or subsequent transmission request is successful.

The destination mobile terminal device 20b outputs, in the fragment response regions FRi (i=1, ..., m) following the fragment region FSDi (i=1, ..., m) in which data is received, response information indicative of success or failure of data receiving. That is, as shown in the FR1 in FIG. 19, (1) success or failure of receiving is set in this slot. For example, when receiving of intra-cell communication is successful, (00011101) is set; when receiving of intra-cell communication is unsuccessful, (11100010) is set; when receiving of multi-address communication is successful, there is no response; and, when receiving of multi-address communication is unsuccessful, (11100010) is set (the above procedure is referred to as response step 204). When this response information indicates the receiving success (ACK), the transfer procedure of the fragment slot is deemed as completed and the assigned slot notice step 202 is repeated for a next fragment region FSD(i+1) of the base station 10. When this response information indicates the unsuccessful receiving (NAK), the data re-transmission is performed in the following manner.

Although, in this case, the mobile terminal device 20 is already registered in the mobile terminal managing database 14, the base station device 10 may perform the position registration processing again in order to improve the accuracy of the content of the mobile terminal managing database 14.

When the base station device 10 normally receives data whose receiving in the destination mobile terminal device 20b is unsuccessful and also when the mobile terminal managing database 14 of the base station device 10 holds the registration of the destination mobile terminal device 20b, the base station device 10 retransmits the data instead of the destination mobile terminal device 20b (the above mentioned procedure is referred to as base station re-transmission step 205). The data re-transmission is realized in the base station device 10 by outputting the header information and the transmission data to the next fragment region FSD(i+1).

However, when receiving of the data whose receiving at the destination mobile terminal device 20b is unsuccessful is also unsuccessful at the base station device 10, and also when the mobile terminal managing database 14 of the base station device 10 holds the registration of the destination mobile terminal device 20b, the base station device 10 assigns the next fragment region FSD(i+1) to the sending mobile terminal device 20a and sets control information instructing a re-transmission at the sender in its header portion (this procedure is referred to as re-transmission slot step 206). When the sending mobile terminal device 20a receives the fragment region FSD(i+1) containing its own address in its sender field, it sends the same data again if retransmission at the sender is instructed in its header portion (this procedure is referred to as sender retransmission step 207).

When the mobile terminal managing database 14 of the base station device 10 does not hold the registration of the destination mobile terminal device 20b, the base station device 10 does not perform re-transmission relating steps 205, 206 or 207.

Figure 11:
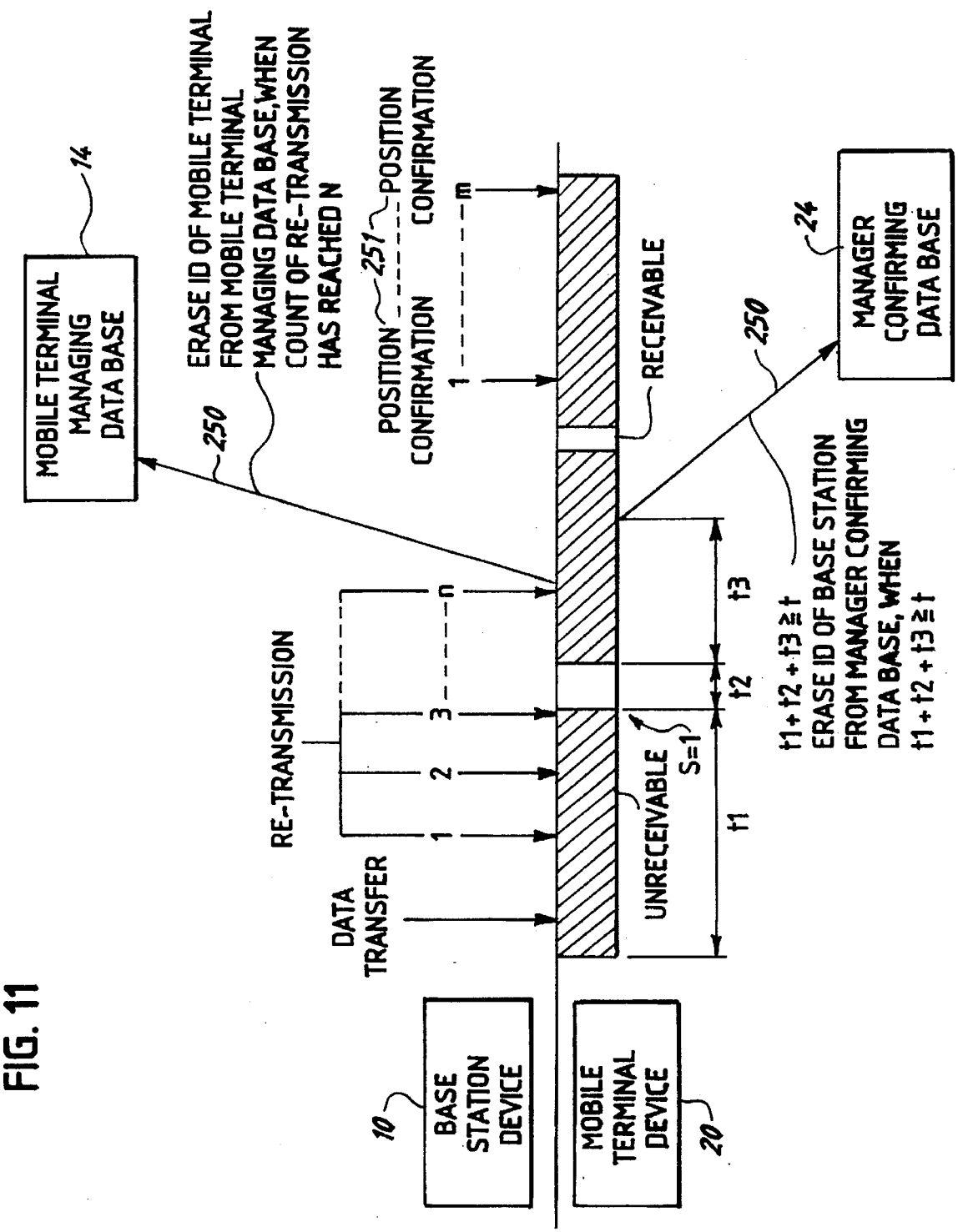
FIG. 11 shows a registration erase procedure of a mobile terminal managing database and a manager confirming database.

The "base station re-transmission step 205" or "sender re-transmission step 207" is repeated until receiving at the destination mobile terminal device 20 is successful or the number of re-transmissions of the same communication reaches a predetermined limit. In the "base station re-transmission step 205", when, for reasons such as unreceivability at the mobile terminal device 20, the base station device 10 fails re-transmission n times (where n>1) continuously, a registration of the mobile terminal device 20 indicating a destination, of re-transmission in the mobile terminal managing database 14 is erased, as shown in FIG. 11 (250). On the other hand, the mobile terminal device 20 always monitors the receiving condition and erases the content of the manager confirmation database 24 as shown in FIG. 11 (250), when a continuous unreceivable time which includes at least s receivable times (where s>0) each receivable time being equal to or shorter than r (where r>0) becomes t (where t>0) or more (this is referred to as unreceivability decided state).

Figure 12:
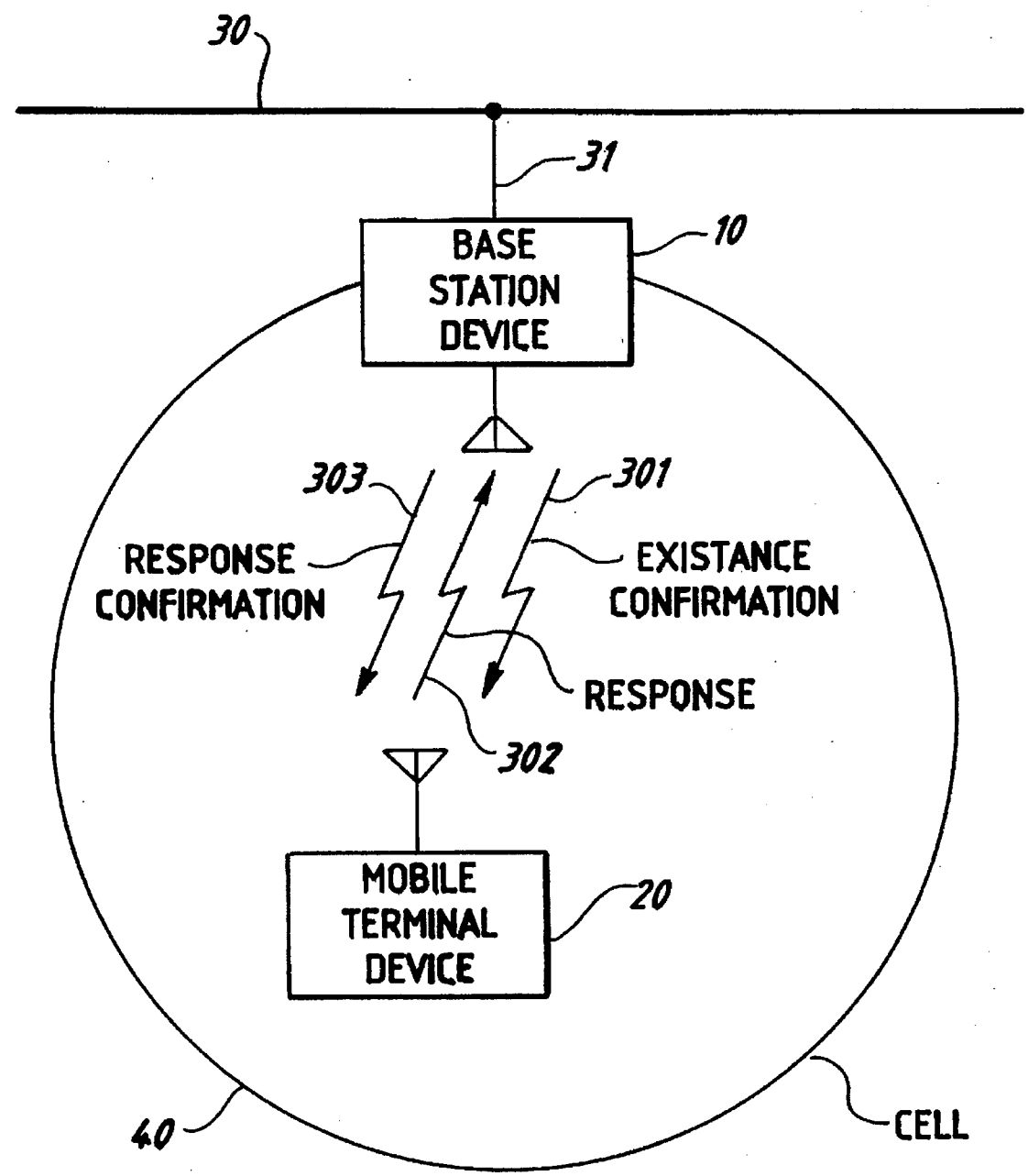
FIG. 12 shows a position confirmation procedure to be performed between a mobile terminal device and a base station device.

The base station device 10 performs a position confirmation 251 for the mobile terminal device 20b whose registration in the mobile terminal managing database 14 was erased, in order to confirm the existence thereof in the cell after time h (h>0) lapses from the erase. This position confirmation 251 is performed through an existence confirmation 301, a response 302 and a response confirmation 303, in that order, as shown in FIG. 12. That is, the base station device 10 confirms the existence of the mobile terminal device 20 in the cell (301), the mobile terminal device 20 responds to the base station device 10 with respect to the confirmation (302), and the base station device 10 confirms the mobile terminal device 20 of the response therefrom (303). In this case, the base station 10 registers the mobile terminal device 20 in the mobile terminal managing database 14 in a manner similar to the position registration and the mobile terminal device 20 stores the identifier of the base station device 10 in the manager confirming database 24.

FIG. 13 shows the receiving response operations of the destination mobile terminal device 20 and the base station device 10. When receiving at the destination mobile terminal device 20 is successful, transfer of the fragment slot completes regardless of whether receiving at the base station device 10 is successful or unsuccessful (401). Successful receiving at the destination mobile terminal device 20 means that the fragment response region FRi (i=1, . . . , m) provides ACK response during the intra-cell communication and no response during the multi-cast communication. On the other hand, when receiving at the destination mobile terminal device 20 is unsuccessful, it results in the base station re-transmission 402 by means of the base station device 10 if receiving at the base station device 10 is successful or results in the sender re-transmission 403 by means of the sending mobile terminal device 20 if receiving at the base station device 10 is unsuccessful. In this case, unsuccessful receiving at the destination mobile terminal device 20 means that the fragment response region FRi (i=1, . . . , m) provides NAK response, response error or no response in the intra-cell communication. In order to standardize the response procedures in both the intra-cell communication and the multi-cast communication, the no response may be defined as successful receiving.

Figure 14:
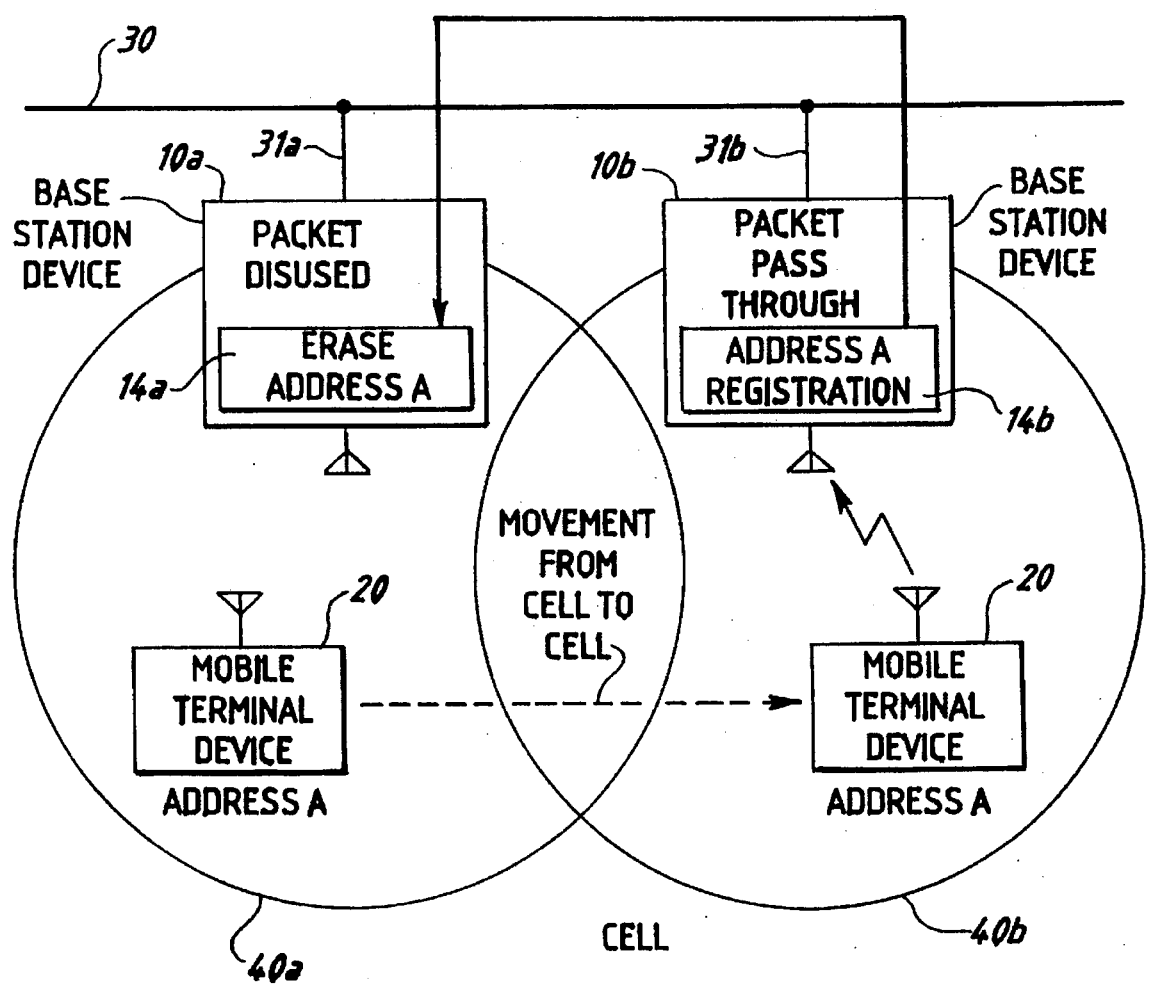
FIG. 14 shows a notice procedure of movement information when a mobile terminal device moves from one cell to another.

FIG. 14 shows a notice method of movement information when a mobile terminal device 20 is moved from one cell to another. The mobile terminal device 20 determines itself as moved from one cell to another from the unreceivability decided state mentioned previously. Such cross-over movement from another cell may be determined by a method other than the unreceivability decision state, e.g., when there is no carrier detected in the unreceivability decision state.

When the mobile terminal device 20 determines that it moved from one cell to another, the content of the manager confirming database 24 is erased and a selection of a receivable base station device 10 is started by changing receiving frequency. When the new receivable base station device 10b is selected, the mobile terminal device 20 performs the previously mentioned position registration request 102. That is, the mobile terminal device 20 sends a packet to the selected base station device 10b to register (position register) an address a of the mobile terminal device 20a in the mobile terminal managing database 14b and notifies all of the base station devices 10 in the wireless network that the mobile terminal device 20 belongs to the new base station device 10b. The respective base station devices 10 thus notified erase the address of the mobile terminal device 20 indicated by the packet if the address is already registered in the mobile terminal managing database 14 or do nothing if it is not registered.

When the mobile terminal device 20 performs the movement such as shown in FIG. 14, an address of the mobile terminal device 20a is registered in the mobile terminal managing database 14b in the base station device 10b to which the mobile terminal device 20a newly belongs and the address a of the mobile terminal device 20a registered in the mobile terminal managing database 14a in the base station device 14a to which the mobile terminal device 20a belonged formerly is erased therefrom, by means of the packet sent from a cell 40b to which the mobile terminal device 10b moved.

The packet to be transmitted is one which passes through the base station device 10 to which the mobile terminal device moved and is "discarded" in other base station devices, which means that the packet is not transmitted in wireless communication to a mobile terminal managed by the other base station devices 10. This may be realized by such as the following methods.

(1) A multi-cast address dedicated to the wireless LAN system is provided. The mobile terminal device 20 which moved transmits a packet to the multi-cast address. The base station device 10 which received the packet attached with the multi-cast address derives necessary information therefrom and then discards the packet.

(2) A dummy terminal device is provided in a wireless network. The mobile terminal device 20 which moved transmits a packet to an address of the dummy terminal device. Base station devices 10 which received the packet attached with the address of the dummy terminal device derive necessary information therefrom and then discard the packet.

(3) A mobile terminal device 20 which moved transmits a packet to its own address. Base station devices 10 which received the packet attached with the address of the mobile terminal device derive necessary information therefrom and then discard the packet.

A method in which a base station device 10 receives a packet transmitted from a mobile terminal device 20 and then notifies a movement to other base station devices 10 by sending the same packet to the respective base station devices 10 through intra-cell communication may be considered. In this case, however, the base station device 10 sends the packet by attaching thereto a sender address which is not its own address but an address of the moved mobile terminal device 20.

As shown in FIG. 14, when a mobile terminal device 20 moves from one cell to another, the base station device 10b in the new cell requests the base station device 10a in the old cell to erase the registration of the mobile terminal device 20 from the mobile terminal managing database 14a of base station device 10a.

According to the present invention, the following advantages are obtainable.

(1) A mobile terminal device registered in the mobile terminal managing database executes retransmission, but retransmission is not performed to mobile terminal devices which are out of management of the base station device; therefore, redundant communication is eliminated, resulting in no degradation of communication efficiency.

(2) In a base station device, a mobile terminal managing database and a mobile terminal confirming database are provided. With this construction, only mobile terminal devices which are already registered in the mobile terminal confirming database are allowed to be registered in the mobile terminal managing database, and therefore it is possible to limit the number of mobile terminal devices to be managed by the base station device. As a result, possibility of collision of transmission requests between mobile terminal devices is reduced, and therefore it is possible to prevent communication efficiency from being lowered.

(3) In a mobile terminal device and a base station device, receiving condition is determined by the detection result of frame synchronization and packet discard occurrences (error occurrences) of the receiving signal. Therefore, occurrences of error in determining a receivable or unreceivable condition is reduced, and degradation of communication efficiency is avoided.

(4) A packet transmitted from a mobile terminal device which moved from one cell to another is discarded in a base station device to which the movement was notified. Therefore, the packet does not flow out in a wireless communication of the base station device to which the movement was notified, and thus degradation of communication efficiency is prevented.

While the invention has been described in connection with a preferred embodiment, it is susceptible to modifications within a range of equivalents without departing from the invention. As such, the invention should not be limited by the particular embodiment described herein, but should be defined only by the appended claims and equivalents thereof.

What is claimed is:

1. A wireless LAN system having a plurality of mobile terminal devices and a plurality of base station devices each capable of managing said mobile terminal devices, and a wired LAN connecting the base station devices for communicating with each other, wherein the base station devices register identifications of all presently managed mobile terminal devices in a first database, and each mobile terminal device registers an identification of a base station device by which said mobile terminal device is presently managed in a second database, a wireless communication takes place between a base station device and a mobile terminal respectively specified by the respectively registered identifications, and communication between mobile terminal devices managed by base station devices takes place through the base station devices and the wired LAN, including:

the mobile terminal devices comprising means for issuing a registration request through a wireless communication; and each base station device comprising a third database for presetting identifications of the mobile terminal devices allowed to subscribe to the system, means for deciding to accept the registration request based on whether or not identification of the request-issuing mobile terminal device is registered in the third database, means for registering acceptance of the request-issuing mobile terminal device into the first database, and means for informing the request-issuing mobile terminal device that the request is successfully accepted.

2. The wireless LAN system of claim 1, wherein said mobile terminal devices and said base station devices have means for deriving a clock of a received signal and means for determining receivability or un-receivability in accordance with whether or not the mobile terminal device or base station device is successfully synchronized with the received signal.

3. The wireless LAN system of claim 1, wherein said mobile terminal devices and said base station devices have means for determining whether a data packet in the received signal includes bit error, means for discarding a data packet if the packet includes bit error, and means for determining receivability or unreceivability based on the rate of packet discard occurrences.

4. The wireless LAN system of claim 1, wherein said means for issuing issues said registration request at a timing when a content of said second database has been erased.

5. The wireless LAN system of claim 1, wherein said mobile terminal devices have means for detecting whether a signal from a base station device is in a receivable state, and means for allowing the means for issuing to send said registration request under said receivable state.

6. The wireless LAN system of claim 1, wherein said mobile terminal devices have a display indicative of whether the mobile terminal device is in an area in which the mobile terminal device cannot communicate with the base station to which the mobile terminal device issues a registration request, means for repeatedly issuing a registration request at a specified time interval, and means for validating said display when said mobile terminal device failed registration to said first database a predetermined p times (where p>1).

7. The wireless LAN system of claim 6, wherein the mobile terminal devices have means for changing the specified time interval of the (p+1)th or subsequent registration request, and means for invalidating said display when the (p+1)th or subsequent registration request is successfully accepted.

8. The wireless LAN system of claim 1, wherein a first base station device has means for assigning a first mobile terminal device a data transmission slot, and said first mobile terminal device has means responsive to the assignment for sending data directly to a second mobile terminal device which is managed by said first base station device that manages said first mobile terminal device in the wireless communication.

9. The wireless LAN system of claim 8, wherein each mobile terminal device has a movement indicator for displaying a movement instruction, and each base station device has means for erasing registration of a mobile terminal device having communication failure from the first database and means for sending a request to a mobile terminal device having communication failure to validate its said movement indicator when registration or erase of said mobile terminal device in said first database of said base station device is performed a predetermined number of times during a predetermined duration.

10. The wireless LAN system of claim 9, wherein when said mobile terminal device having said movement indicator validated completes a registration to a first database of a base station device, said movement indicator is invalidated.

11. The wireless LAN system of claim 8, wherein the base station device has means for receiving data of the first mobile terminal device while the data is being sent between the first and the second mobile terminal devices in the wireless communication, means for detecting receivability of the second mobile terminal device, and means for re-transmitting the received data to the second mobile terminal device if the second mobile terminal device has communication failure.

12. The wireless LAN system of claim 11, wherein, when said base station device fails re-transmission n times (where n>1) continuously, a registration of said mobile terminal device indicating a destination of re-transmission in said first database is erased.

13. The wireless LAN system of claim 12, wherein, when a continuous time which includes at least s receivable times (where s>0), each receivable time being equal to or shorter than r (where r>0) becomes t (where t>0) or more during a receiving time of said mobile terminal device, said mobile terminal device erases the content of said second database.

14. The wireless LAN system of claim 8, wherein the first mobile terminal device and the second mobile terminal device which are managed by the same base station communicate directly with one another, and the base station receives data transmitted between the first mobile terminal device and the second mobile terminal device and retransmits data in case of failure of direct communication between the first and second mobile terminal devices.

15. The wireless LAN system of claim 1, wherein at least one mobile terminal device has manual input means for directing the means for issuing to send a registration request to a first database of a base station device.

16. The wireless LAN system of claim 1, wherein a mobile terminal device that was moved to a first service area serviced by a first base station device from a second service area serviced by a second base station device transmits a packet transmittal through the second base station device to all of the remaining base station devices in said system, each base station device has means responsive to said packet transmittal for re-writing a content of said first database if changes are required, and means for discarding said packet.

17. The wireless LAN system of claim 1, wherein a first base station device comprises means for erase of a registration of one mobile terminal device from its first database when a second base station device sends the first base station device a request requiring a registration erase through the wired LAN by specifying the one mobile terminal device.

18. A base station device capable of performing a bidirectional wireless communication with mobile terminal devices through a wireless network and performing a communication with another base station device through a wired LAN, and having a mobile terminal managing database for holding identification of currently managed mobile terminal devices, comprising a mobile terminal confirming database for pre-setting identification of mobile terminal devices which are allowed as subscribers of said wireless network;

means for refusing a request from a mobile terminal for which identification is not found in the mobile terminal confirming database; and means for registering identification of a mobile terminal device in the mobile terminal managing database when identification of the mobile terminal device is found in said mobile terminal confirming database.

19. A wireless network control method for a wireless communication network comprising a plurality of mobile terminal devices including a method for restricting the number of mobile terminal devices which are managed by a base station device in said network; the base station device having a first database which contains identifications of all mobile terminal devices which are allowed as subscribers to said network and a second database which holds identifications of all presently-managed mobile terminal devices, including the steps of:

pre-setting in said first database identifications of the mobile terminal devices which are allowed as subscribers of the base station device in the wireless network;

receiving, by the base station device, a registration request through a wireless communication from one of the mobile terminal devices;

deciding, by the base station device, whether to accept the wireless registration request based on whether or not identification of the request-issuing mobile terminal device is preset in said first database;

registering, by the base station device, acceptance of the request-issuing mobile terminal device into the second database if said identification of the request-issuing mobile terminal device is preset in said first database; and informing the request-issuing mobile terminal device that the request has been successfully accepted.

20. A wireless network control method according to claim 19, further comprising the step of sending, with an accepted first mobile terminal device, data directly to a second mobile terminal device which is managed by the same base station device as said first mobile terminal device in the wireless communication network.

21. A wireless network control method according to claim 20, comprising the further steps of receiving, with the base station device, data of the first mobile terminal device while sending between the first and the second mobile terminal devices in the wireless communication network, and sending, with the base station device, the received data to the second mobile terminal device, if the second mobile terminal device fails to receive the data from the first mobile terminal device.

22. A wireless network control method for controlling a wireless LAN system wherein mobile terminal devices are managed by a base station device in a wireless communication network and the base station device has a mobile terminal managing database which holds identifications of presently managed mobile terminal devices, including the steps of:

assigning, with the base station device, a first mobile terminal device a data transmission slot;

responsive to the assignment, sending, by the first mobile terminal device, data directly to a second mobile terminal device in a wireless communication;

receiving the data, by the base station device, while the data is being sent directly between the first and second mobile terminal devices in the wireless communication;

detecting, by the base station device, receivability of the second mobile terminal device; and re-transmitting, by the base station device, the received data to the second mobile terminal device if the second mobile terminal has communication failure and the second mobile terminal device is registered in the mobile terminal managing database.

23. A wireless network control method according to claim 22, further comprising the step of prohibiting the re-transmission step if the second mobile terminal device's identification is not registered in the mobile terminal managing database.

24. A wireless network control method according to claim 23, further comprising the step of repeating the re-transmission when the second mobile terminal device responds with an acknowledge signal.

25. A wireless network control method according to claim 24, wherein, when a base station device fails re-transmission n times (where n>1) continuously, the method further comprises the step of erasing a registration of the second mobile terminal device in said mobile terminal managing database.

26. A wireless network control method according to claim 22, comprising the step of requesting, with the base station device, the first mobile terminal device to send the data again if both of the second mobile terminal device and the base station device could not receive the data.

* * * * *